(12) United States Patent
Dong

(10) Patent No.: US 6,564,545 B1
(45) Date of Patent: May 20, 2003

(54) SUPERINTEGRATION OF THREE WAY CATALYST AND HEAT EXCHANGER FOR HCCI ENGINE INTAKE AIR TEMPERATURE CONTROL

(75) Inventor: Yu Dong, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/062,353

(22) Filed: Jan. 31, 2002

(51) Int. Cl.$^7$ ................................. F01N 3/00
(52) U.S. Cl. ..................... 60/289; 60/298; 60/320; 123/142.5 R; 123/556; 165/51; 165/52
(58) Field of Search ..................... 60/287, 288, 289, 60/291, 292, 293, 298, 307, 320, 299; 123/41.14, 142.5 R, 543, 555, 556; 165/42, 51, 52

(56) References Cited

U.S. PATENT DOCUMENTS

| | | | |
|---|---|---|---|
| 3,473,522 A | | 10/1969 | Bailey |
| 4,272,958 A | * | 6/1981 | Waltrip ................. 60/309 |
| 4,453,524 A | | 6/1984 | Lee |
| 4,497,305 A | | 2/1985 | Ozawa |
| 5,033,264 A | | 7/1991 | Cabral |
| 5,085,049 A | | 2/1992 | Rim et al. |
| 5,467,757 A | | 11/1995 | Yanagihara et al. |
| 5,685,145 A | * | 11/1997 | Sung et al. ............. 60/284 |
| 5,743,243 A | | 4/1998 | Yanagihara |
| 5,785,030 A | | 7/1998 | Paas |
| 5,799,632 A | * | 9/1998 | Bennett ............... 123/142.5 |
| 5,890,360 A | | 4/1999 | Sasaki et al. |
| 6,006,720 A | | 12/1999 | Yanagihara et al. |
| 6,151,891 A | * | 11/2000 | Bennet ................. 60/298 |
| 6,155,042 A | | 12/2000 | Perset et al. |
| 6,178,744 B1 | * | 1/2001 | Perset ................. 60/288 |
| 6,182,643 B1 | * | 2/2001 | Canopy ............... 123/542 |

FOREIGN PATENT DOCUMENTS

| | | |
|---|---|---|
| EP | 639710 B1 | 2/1996 |
| EP | 803645 A1 | 10/1997 |
| EP | 0924416 | 6/1999 |
| EP | 853188 B1 | 5/2000 |
| JP | 7063136 | 3/1995 |
| JP | 7317588 | 12/1995 |
| JP | 7332140 | 12/1995 |
| JP | 9287528 | 11/1997 |
| JP | 10252541 | 9/1998 |
| JP | 10252570 | 9/1998 |
| JP | 10288038 | 10/1998 |
| JP | 11022535 | 1/1999 |
| JP | 11072038 | 3/1999 |
| JP | 11148412 | 6/1999 |
| JP | 11236848 | 8/1999 |
| WO | 98/10179 | 3/1998 |

* cited by examiner

Primary Examiner—Thomas Denion
Assistant Examiner—Binh Tran
(74) Attorney, Agent, or Firm—Brinks Hofer Gilson & Lione

(57) ABSTRACT

A superintegration of heat exchanger and a typical three way catalyst is disclosed for controlling the temperature of the air entering an internal combustion engine in a homogeneous charge compression ignition engine system. The superintegrated heat exchanger includes a typical catalyst reaction chamber, a coolant pipe coil and a heat exchange unit. A portion of the fresh air induced into air pathway in the superintegrated heat exchanger is preheated by coolant pipe coil and hot surface of the three way catalyst and then is finally heated by exhaust gas through a heat exchanger unit. The heated air is fed back to an intake temperature control valve and is mixed with another portion of fresh air after a Y junction following engine throttle. The intake temperature control valve driven by a step motor can precisely and rapidly control the temperature of fresh and heated air mixture by a locally close-loop controller. The temperature-controlled air is induced into an engine for homogeneous charge compression ignition (HCCI) engine autoignition and combustion phasing control.

16 Claims, 2 Drawing Sheets

SUPERINTEGRATION OF THREE WAY CATALYST AND HEAT EXCHANGER FOR HCCI ENGINE INTAKE AIR TEMPERATURE CONTROL

TECHNICAL FIELD

The present invention relates generally to homogeneous charge compression ignition combustion engine systems and, more specifically, to a homogeneous charge compression ignition combustion engine system that can be used in a production vehicle.

BACKGROUND

Engineers and scientists in the field of combustion technology are investigating homogeneous charge compression ignition engines (HCCI engines) because they offer several benefits not currently available through other combustion engine technologies. HCCI engines are thought of as a hybrid of traditional spark ignition gasoline fueled engines and compression ignition diesel fueled engines. They have the potential to meet super, ultra-low emission vehicle standards while providing high efficiency power generation.

HCCI combustion is achieved when air, fuel and recycled exhaust gas is mixed homogeneously, compressed and auto-ignited. More specifically, combustion occurs spontaneously and homogeneously without flame propagation. In other words, there is no discernible flame front and no localized high temperature reaction region. Further, this is a lean combustion process. All of these factors contribute to a lower local flame temperature and, therefore, lower amounts of Nitric Oxide ($NO_x$) and particulate matter in the emissions.

In the automotive arena, there are several hurdles that must be overcome prior to HCCI engines being used on production vehicles. The main obstacles include low power density, difficulty in controlling the start of combustion, high rates of heat release, and high hydrocarbon (HC) and carbon monoxide (CO) emissions. Among these, the principal challenge is control of the auto-ignition and combustion phasing.

The start of ignition is established by the auto-ignition chemistry of the air-fuel mixture, which is influenced significantly by the time-temperature history to which the mixture is exposed. It has been shown that the most effective method for combustion phasing control is to modulate the intake air temperature. Currently, an electric heater is used to regulate the intake air temperature. It is not desirable to use an electric heater on a production vehicle because the heat generated by the electric heater is either from engine output, which would decrease overall engine thermal efficiency, or from outside power, which only can be used in laboratory.

BRIEF SUMMARY

The present invention overcomes the disadvantages of prior homogeneous charge compression ignition engine systems. This system can be used in a production vehicle since it utilizes heat from existing sources to heat the air entering the engine. Specifically utilized are heat from engine coolant, heat given off by catalytic reactions and, the heat of the exhaust gas released from the engine. In fact, the heat generated from these components is usually wasted. The system disclosed here does not require an external electric heater to control the temperature of the air entering the engine.

A homogeneous charge compression ignition engine system is disclosed for controlling the temperature of the air entering the engine. The system includes a Y-junction, an intake temperature control valve, a homogeneous charge compression ignition engine, and a superintegrated heat exchanger. The superintegrated heat exchanger further includes a catalyst reaction chamber, a coolant pipe coil that is positioned adjacent the catalyst reaction chamber, and a heat exchange unit. The Y-junction and intake temperature control valve are positioned before the engine. The superintegrated heat exchanger is positioned after the engine.

Fresh air is drawn into the system through an engine throttle into the Y-junction. The Y-junction directs a potion of the fresh air into the intake temperature control valve and the rest of the fresh air to the superintegrated heat exchanger. Therefore, the Y-junction has a first outlet and a second outlet. The air that subsequently flows to the intake valve exits from the Y-junction through the first outlet and the air that subsequently flows to the superintegrated heat exchanger exits from the Y-junction through the second outlet.

The superintegrated heat exchanger is positioned downstream from or after the homogeneous charge compression ignition engine. The superintegrated heat exchanger consists of two pathways. The contents of the two pathways remain separate throughout the system.

The inlet for the first pathway is positioned for receiving the exhaust gas from the engine. First, the exhaust gas is directed through the catalyst reaction chamber. Second, the exhaust gas is directed through the heat exchange unit. The heat exchange unit is positioned adjacent to the catalyst reaction chamber. Third, the exhaust gas is directed out of the first pathway through the first pathway outlet.

The inlet for the second pathway receives fresh air that has passed through the second outlet of the Y-junction. First, the fresh air is directed around the catalyst reaction chamber and coolant pipe coil so that it is heated to a pre-heated temperature. Second, the pre-heated air is directed through the heat exchange unit to further heat the pre-heated air to a final-heated temperature. Third, the final-heated air is directed out a second pathway outlet. The second pathway outlet is connected to the intake temperature control valve. Therefore, the heated air is then fed back into the intake temperature control valve.

The intake temperature control valve has two inlets. The first inlet receives fresh air. The second inlet receives the heated air from the superintegrated heat exchanger. The intake temperature control valve has one outlet from which the mixture of fresh and heated air is directed into the homogeneous charge compression ignition engine.

In another aspect of the present invention a method of controlling the temperature of air entering a homogeneous charge compression ignition engine is disclosed. The method includes the steps of: A) heating fresh air via a superintegrated heat exchanger that extracts heat from the engine exhaust, the superintegrated heat exchanger comprising a catalyst reaction chamber and a heat exchanger unit; B) directing the heated air to an intake temperature control valve that is positioned upstream from the engine; C) mixing the heated air with unheated fresh air to obtain a mixture of heated and unheated fresh air that is at a predetermined temperature; D) directing the heated air and unheated fresh air mixture into the engine; and E) directing the exhaust from the engine through the superintegrated heat exchanger.

DETAILED DESCRIPTION

The following description of the preferred embodiment of the invention is not intended to limit the invention to this preferred embodiment, but rather to enable a person skilled in the art of homogeneous charge compression ignition engine systems to make and use this invention.

Figure 1:
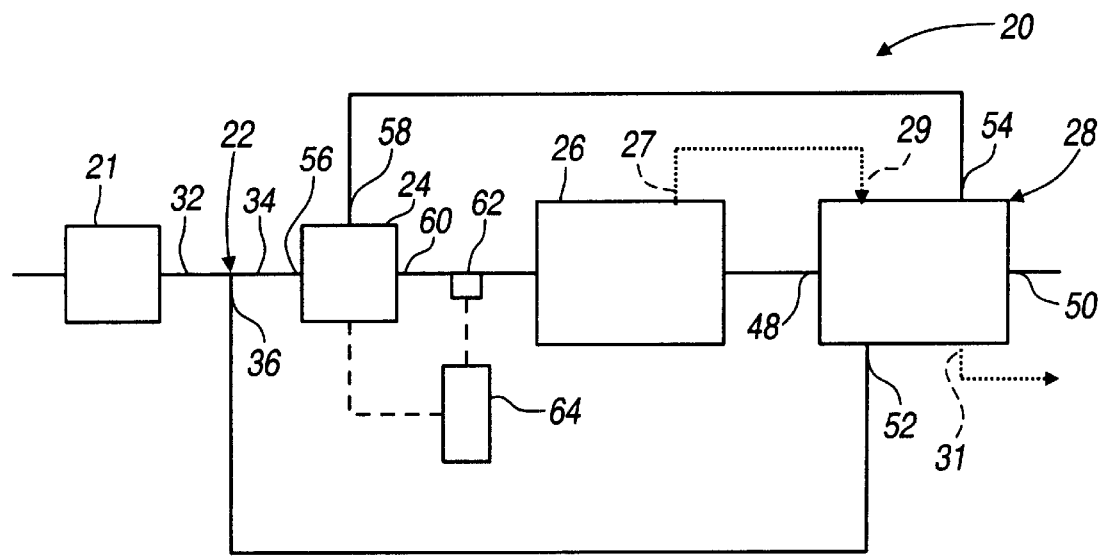
FIG. 1 is a schematic view of an embodiment of the present invention.

As shown in FIG. 1, the homogeneous charge compression ignition engine system, shown generally at 20, includes a Y-junction 22, an intake temperature control valve 24, a homogeneous charge compression ignition engine 26, and a superintegrated heat exchanger, shown generally at 28. This whole system 20 can be used in a production vehicle. In a vehicle, there is also a throttle 21 positioned before the Y-junction 22. The Y-junction 22 and intake temperature control valve 24 are positioned upstream from or before the engine 26 and the superintegrated heat exchanger 28 is positioned downstream from or after the engine 26.

The solid lines in FIG. 1 represent the path of gas flow through the system 20. The dotted line represents liquid flow through the system 20. The dashed line represents the path of electric/electronic signals within the system 20.

The Y-junction 22 has one inlet 32 for receiving fresh air and two outlets 34, 36. The first outlet 34 directs fresh air to the intake temperature control valve 24. The second outlet 36 directs fresh air to the superintegrated heat exchanger 28.

Figure 2:
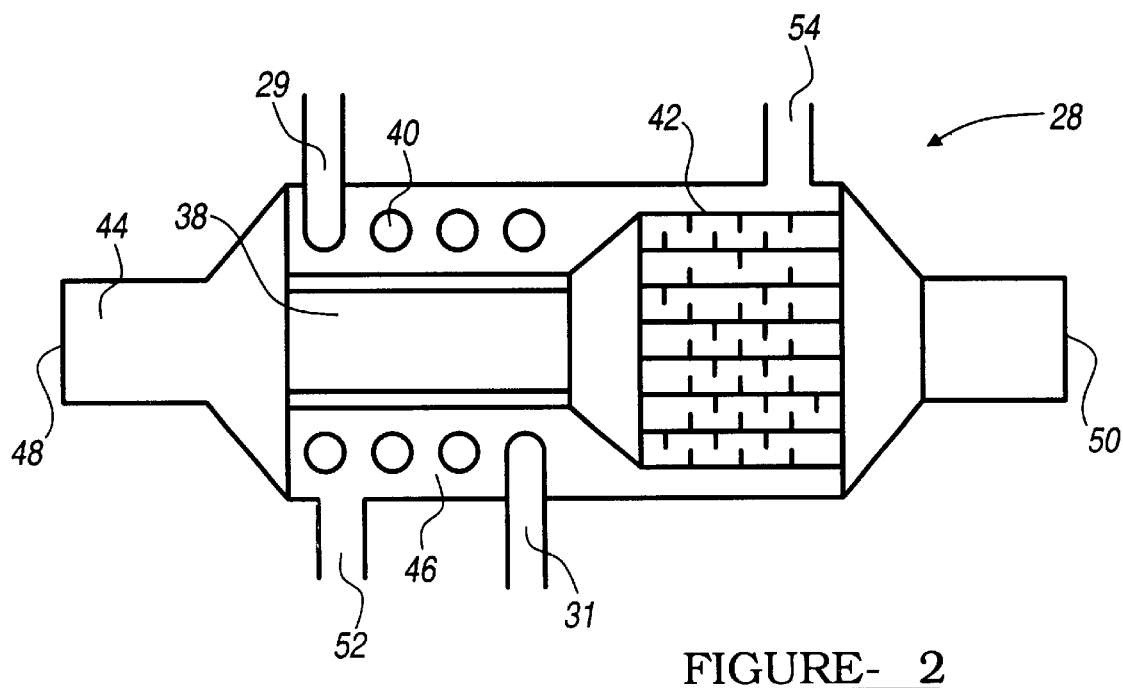
FIG. 2 is a schematic view of the superintegrated heat exchanger.

As shown in FIG. 2, the superintegrated heat exchanger 28 includes a catalyst reaction chamber 38, a coolant pipe coil 40 that is positioned adjacent the catalyst reaction chamber 38 and a heat exchange unit 42 in communication and integration with the catalyst reaction chamber 38. Preferably, the catalyst in the catalyst reaction chamber 38 is a three-way catalyst. The heat exchange unit 42 is a gas-to-gas exchange unit since the heat from the exhaust gas is used to heat the fresh air.

The coolant pipe coil 40 encircles the catalyst reaction chamber 38 at least once. In a preferred embodiment, the coolant pipe coil 40 contains engine coolant that has been circulated around the engine 26. Therefore, the coolant is at an elevated temperature. The engine coolant exits from the engine 26 at engine coolant outlet 27 and enters the superintegrated heat exchanger 28 at inlet 29. The engine coolant exits from the superintegrated heat exchanger through outlet 31. The coolant pipe coil serves two functions. The first function involves heating the fresh air to a pre-heated temperature. The second function involves ensuring that the catalyst reaction chamber does not exceed a certain temperature range.

The superintegrated heat exchanger 28 has two pathways 44, 46. The first pathway 44 is for the exhaust gas exiting from the homogeneous charge compression ignition engine 26. The exhaust gas enters the first pathway inlet 48 and is directed through the catalyst reaction chamber 38. Heat is generated as the exhaust gas reacts with the catalyst. Next, the exhaust gas is directed through the heat exchange unit 42. Finally, the exhaust gas is directed out of the first pathway outlet 50.

The second pathway 46 is for the fresh air that is directed out of the Y-junction second outlet 36. The fresh air enters the second pathway 46 via the second pathway inlet 52. The fresh air is directed around the catalyst reaction chamber 38 and the coolant pipe coil 40. The fresh air is preheated as it comes in contact with the exterior of the catalyst reaction chamber 38. A liquid-to-gas heat exchange takes place when the fresh air comes into contact with the coolant pipe coil 40. These cause the fresh air to be heated to a pre-heated temperature. The pre-heated air is then directed through the heat exchange unit 42. This causes the pre-heated air to be further heated to a final-heated temperature. The final-heated air exits from a second pathway outlet 54 and is fed back to the intake temperature control valve 24. It is important to note that the contents of the first pathway 44 are at all times separate from the contents of the second pathway 46 in the superintegrated heat exchanger 28.

Figure 3:
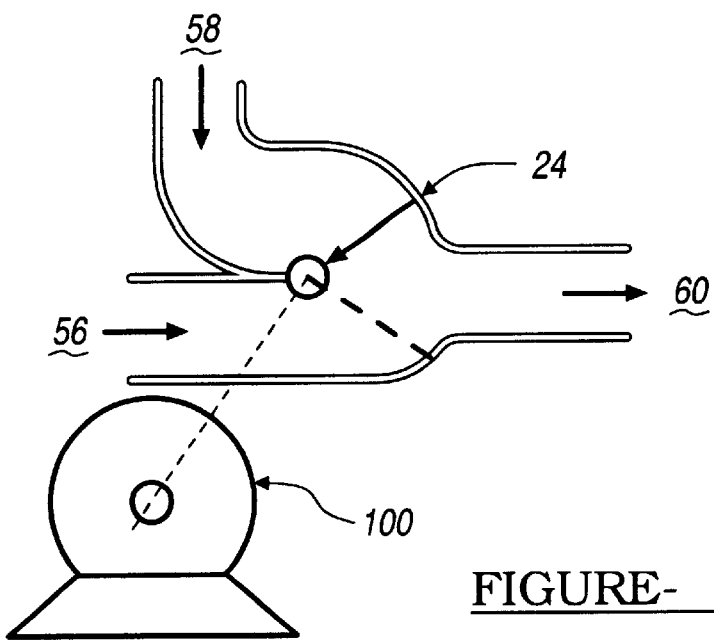
FIG. 3 is a schematic view of the intake temperature control valve with a pulse frequency modulated step motor.

As shown in FIG. 3, the intake temperature control valve 24 has two inlets 56, 58. The first inlet 56 receives fresh air from the Y-junction first outlet 34 and the second inlet 58 receives heated air from the superintegrated heat exchanger second pathway outlet 54. The intake temperature control valve 24 has one outlet 60 that directs a mixture of the unheated fresh air and heated air into the engine 26. In one embodiment, the intake temperature control valve 24 is a positioning valve driving by a pulse frequency modulated step motor 100. Preferably, the response time of the intake temperature control valve is less than one hundred miniseconds to capture engine transient conditions. And it should possess a linear relationship between the required temperature and the control valve angle for temperature precision control.

The system 20 also includes a temperature sensor 62 and a controller 64. The temperature sensor 62 is positioned between the intake temperature control valve 24 and the engine 26. The sensor 62 senses the temperature of the mixture of heated and unheated fresh air prior to entering the engine 26. The controller 64 is in communication with the temperature sensor 62 by detecting the temperature of the heated and unheated fresh air mixture. The controller 64 also controls the angular position of the intake temperature control valve 24 so that the temperature of the mixture remains within a predetermined range. The controller 64 also has the ability to compare the temperature readings and predetermined temperature obtained by engine mapping and send the differential temperature signal to control the intake temperature control valve 24.

Figure 4:
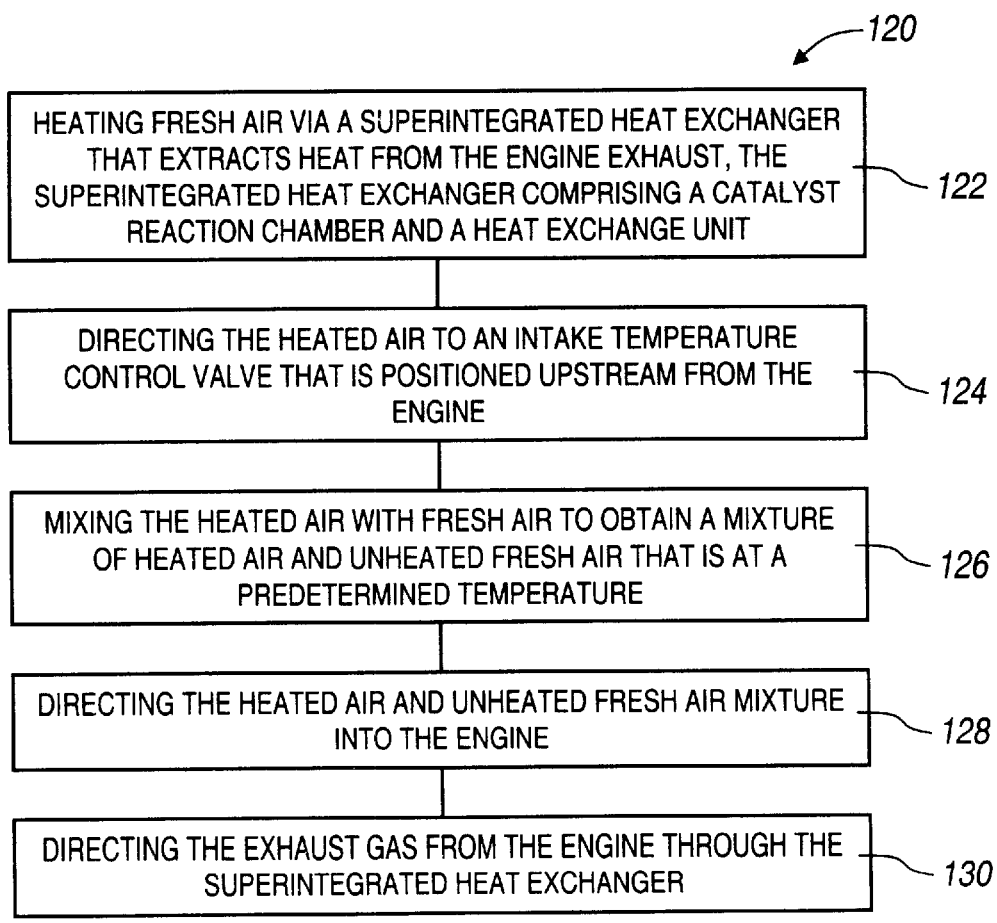
FIG. 4 is a flowchart of the method of the present invention.

FIG. 4 illustrates a method for controlling the temperature of air entering a homogeneous charge compression ignition engine, shown generally at 120. Fresh air is heated via a superintegrated heat exchanger that extracts heat from the engine exhaust, shown at 122. The superintegrated heat exchanger comprises a catalyst reaction chamber and a heat exchange unit. The heated air is directed to an intake temperature control valve that is positioned upstream from the engine, shown at 124. The heated air is mixed with fresh air to obtain a mixture of heated air and fresh air that is at a predetermined temperature, shown at 126. The mixture of heated and unheated fresh air is directed into the engine, shown at 128. The exhaust from the engine is directed through the integrated heat exchanger, shown at 130.

As a person skilled in the art of homogeneous charge compression ignition engine systems will recognize from the previous detailed description and from the figures and claims, modifications and changes can be made to the preferred embodiment of the invention without departing from the scope of this invention as defined in the following claims.

What is claimed is:

1. A homogeneous charge compression ignition engine system for controlling the temperature of air entering a homogeneous charge compression ignition engine, the system comprising:

a superintegrated heat exchanger positioned after the engine and including a catalyst reaction chamber, a coolant pipe coil containing coolant positioned adjacent the catalyst reaction chamber, and a heat exchange unit in communication with the catalyst reaction chamber; wherein the superintegrated heat exchanger has a first pathway and a second pathway; an inlet for the first pathway is positioned for receiving the exhaust gas from the engine, directing the exhaust gas through the catalyst reaction chamber, through the heat exchange unit, and out a first pathway outlet; an inlet for the second pathway is positioned for receiving fresh air, directing the fresh air around the catalyst reaction chamber and coolant pipe coil to heat the fresh air to a pre-heated temperature, directing the pre-heated air through the heat exchange unit to heat the pre-heated air to a final-heated temperature, and directing the final-heated air out a second pathway outlet and into an inlet in the engine.

2. The homogeneous charge compression ignition engine of claim 1 further comprising an intake temperature control valve positioned before the engine, the intake temperature control valve having a first inlet for fresh air, a second inlet for heated air, and an outlet for directing a mixture of fresh air and heated air into the engine.

3. The homogeneous charge compression ignition engine of claim 2 further comprising a Y-junction positioned before the intake valve, the Y-junction having an inlet for receiving fresh air, a first outlet for directing fresh air to the intake temperature control valve first inlet, and a second outlet for directing fresh air into the superintegrated heat exchanger.

4. The homogeneous charge compression ignition engine system of claim 1 wherein the second pathway outlet of the superintegrated heat exchanger is connected to the intake temperature control valve second inlet.

5. The homogeneous charge compression ignition engine system of claim 1 further comprising a temperature sensor positioned between the intake temperature control valve and the engine for sensing the temperature of the mixture of fresh air and heated air entering the engine; a controller that is in communication with the temperature sensor for detecting the temperature of the fresh and heated air mixture and precisely and rapidly controlling the intake temperature control valve so that the temperature of the fresh and heated air mixture remains within a predetermined range.

6. The homogeneous charge compression ignition engine system of claim 5 wherein the controller maps a history of the mixture of fresh and heated air temperature readings.

7. The homogeneous charge compression ignition engine system of claim 1 wherein the intake temperature control valve is a positioning valve driving by a pulse frequency modulated step motor.

8. The homogeneous charge compression ignition engine system of claim 7 wherein an intake temperature control valve response time is less than one hundred mini-seconds.

9. The homogeneous charge compression ignition engine system of claim 1 wherein the catalyst reaction chamber includes a three-way catalyst.

10. The homogeneous charge compression ignition engine system of claim 1 wherein the coolant pipe coil contains engine coolant that has been circulated around the engine.

11. The homogeneous charge compression ignition engine system of claim 1 wherein the coolant pipe is a coil that encircles the catalyst reaction chamber at least once.

12. The homogeneous charge compression ignition engine system of claim 1 wherein the heat exchange unit is a gas-to-gas exchange unit.

13. The homogeneous charge compression ignition engine system of claim 1 wherein the system is located in a vehicle.

14. A method for rapidly controlling the temperature of air entering a homogeneous charge compression ignition engine, the method comprising:

heating fresh air via a superintegrated heat exchanger that extracts heat from the engine exhaust, the superintegrated heat exchanger comprising a catalyst reaction chamber and a heat exchange unit;

directing the heated air to an intake temperature control valve that is positioned upstream from the engine;

mixing the heated air with fresh air to obtain a mixture of heated air and unheated fresh air that is at a predetermined temperature;

directing the heated air and unheated fresh air mixture into the engine; and directing the exhaust from the engine through the superintegrated heat exchanger.

15. The method according to claim 13 further comprising the step of monitoring the temperature of the unheated fresh air and heated air mixture prior to the mixture entering the engine.

16. The method according to claim 14 further comprising the step of maintaining the temperature of the unheated fresh air and heated air mixture within a predetermined range.

* * * * *